(12) United States Patent
Tissakht et al.

(10) Patent No.: US 9,097,347 B2
(45) Date of Patent: Aug. 4, 2015

(54) CARBON SEAL ASSEMBLY

(71) Applicant: PRATT & WHITNEY CANADA CORP., Longueuil (CA)

(72) Inventors: Mustapha Tissakht, Montreal (CA); Sean Powers, Candiac (CA); Vladimir Valentinovich Vorobyev, St. Petersburg (RU); Dany Blais, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 147 days.

(21) Appl. No.: 13/799,027

(22) Filed: Mar. 13, 2013

(65) Prior Publication Data

US 2014/0265142 A1   Sep. 18, 2014

(51) Int. Cl.
*F16J 15/34* (2006.01)
*F16J 15/38* (2006.01)

(52) U.S. Cl.
CPC ............. *F16J 15/3444* (2013.01); *F16J 15/38* (2013.01)

(58) Field of Classification Search
CPC .... F16J 15/344; F16J 15/3444; F16J 15/3496
USPC .......................................... 277/358, 378, 404
See application file for complete search history.

(56) References Cited

U.S. PATENT DOCUMENTS

| | | | |
|---|---|---|---|
| 5,730,447 A * | 3/1998 | Dawson et al. | 277/378 |
| 7,249,769 B2 | 7/2007 | Webster | |
| 8,474,826 B2 * | 7/2013 | Villeneuve et al. | 277/377 |
| 2002/0060432 A1 | 5/2002 | Webster | |
| 2006/0244221 A1 * | 11/2006 | Villeneuve et al. | 277/410 |

* cited by examiner

*Primary Examiner* — Gilbert Lee
(74) *Attorney, Agent, or Firm* — Norton Rose Fulbright Canada LLP

(57) ABSTRACT

A carbon seal assembly comprises an annular seal runner adapted to be sealingly mounted to a shaft to rotate therewith. An annular member is secured to a structure, the annular member having an annular body and a projection extending from the body toward the seal runner in an axial direction relative to an axis of the runner. A axial gap is defined between the member and the seal runner when secured to the shaft and structure respectively, with the projecting extending into only a portion of the gap, such that the gap defines a first width portion and a second width portion, with the member and the seal runner being made of complementary materials for magnetic attraction therebetween. An annular carbon element is mounted to the seal runner to rotate therewith and positioned in the first width portion of the gap, the carbon element having an annular wear surface abutting against the annular member, a plane of the annular wear surface being axially offset from the second width portion of the gap.

20 Claims, 4 Drawing Sheets

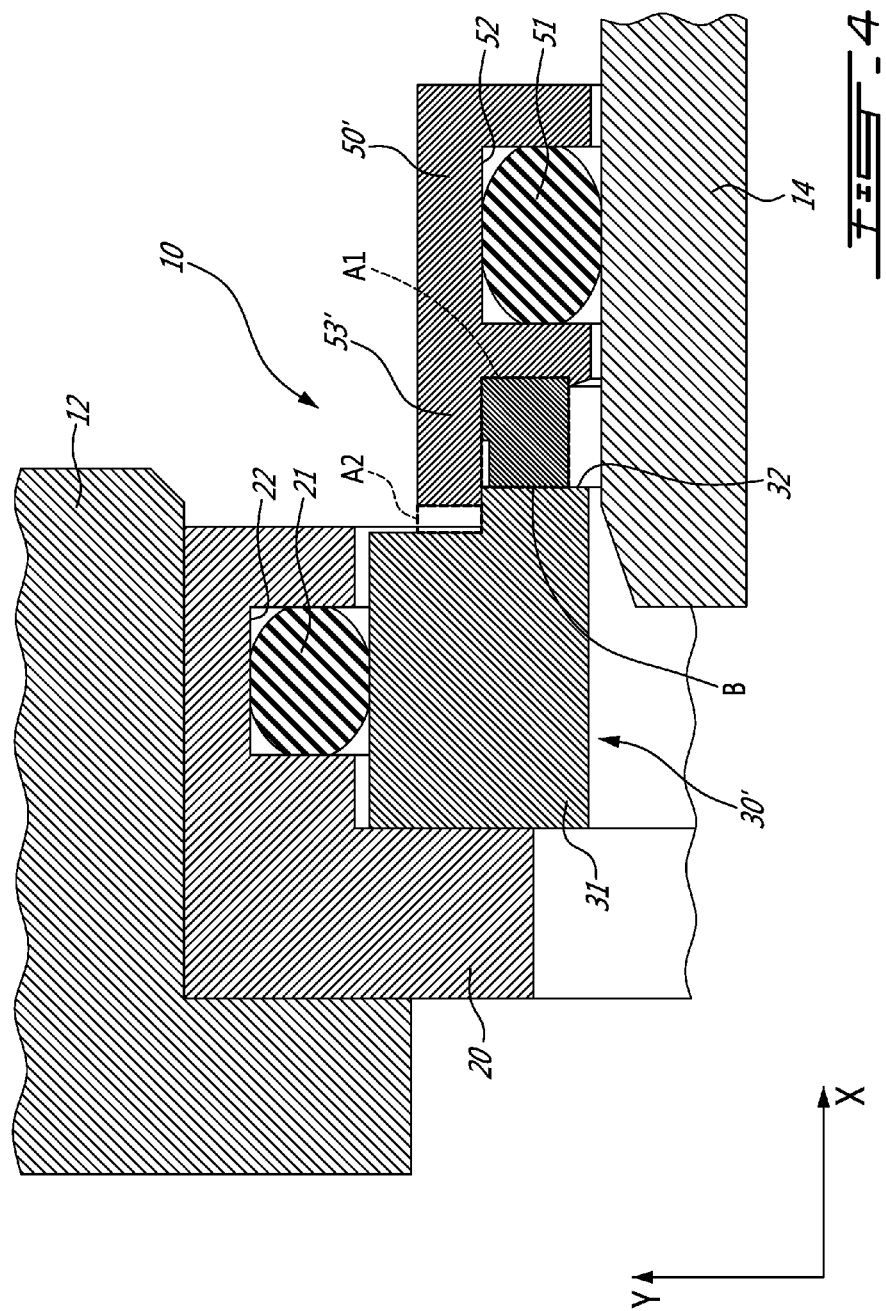

CARBON SEAL ASSEMBLY

TECHNICAL FIELD

The present disclosure relates to a carbon seal assembly of the type found between a structure and a rotating component such as a shaft, for instance in gas turbine engines of aircraft, or in a turbomachine, pump, compressor, turbocharger or the like.

BACKGROUND OF THE ART

Carbon seal assemblies are commonly used for separation of cavities in the presence of rotating components. Carbon seal assemblies commonly have a ring of magnetic material fixed to a structure, and a carbon seal that is part of a sealing assembly on a shaft and rotating therewith, the carbon seal being drawn toward the structure by magnetic forces exerted by the magnetic material. This creates contact pressure in the magnet-to-carbon contact area or wear interface providing therefore positive sealing. It can happen during operation that the carbon becomes deteriorated so contact between the magnet and a metal sealing ring supporting the carbon seal becomes possible. Such a situation may lead to an undesirable fluid media leak through the carbon seal assembly. Once metal to metal contact occurs, the loss of fluid (typically lubrication fluid) may also lead to mechanical distress of the component being sealed.

SUMMARY

In one aspect, there is provided a carbon seal assembly comprising: n annular seal runner adapted to be sealingly mounted to a shaft to rotate therewith; an annular member adapted to be secured to a structure, the annular member having an annular body and a projection extending from the body toward the seal runner in an axial direction relative to an axis of the runner, a axial gap being defined between the member and the seal runner when secured to the shaft and structure respectively, with the projecting extending into only a portion of the gap, such that the gap defines a first width portion and a second width portion, with the member and the seal runner being made of complementary materials for magnetic attraction therebetween; and an annular carbon element mounted to the seal runner to rotate therewith and positioned in the first width portion of the gap, the carbon element having an annular wear surface abutting against the annular member, a plane of the annular wear surface being axially offset from the second width portion of the gap.

In a second aspect, there is provided an engine comprising: a structure; a shaft operatingly mounted to the structure to rotate relative to the structure; a carbon seal assembly comprising: an annular seal runner adapted to be sealingly mounted to a shaft to rotate therewith; an annular member adapted to be secured to a structure, the annular member having an annular body and a projection extending from the body toward the seal runner in an axial direction relative to an axis of the runner, a axial gap being defined between the member and the seal runner when secured to the shaft and structure respectively, with the projecting extending into only a portion of the gap, such that the gap defines a first width portion and a second width portion, with the member and the seal runner being made of complementary materials for magnetic attraction therebetween; and an annular carbon element mounted to the seal runner to rotate therewith and positioned in the first width portion of the gap, the carbon element having an annular wear surface abutting against the annular member, a plane of the annular wear surface being axially offset from the second width portion of the gap.

Further details of these and other aspects of the present invention will be apparent from the detailed description and figures included below.

DESCRIPTION OF THE DRAWINGS

Reference is now made to the accompanying figures, in which:

FIG. 4 is a cross-sectional view of the carbon seal assembly between the structure and the shaft in accordance with a second embodiment of the present disclosure.

DETAILED DESCRIPTION OF THE EMBODIMENTS

Figure 1:
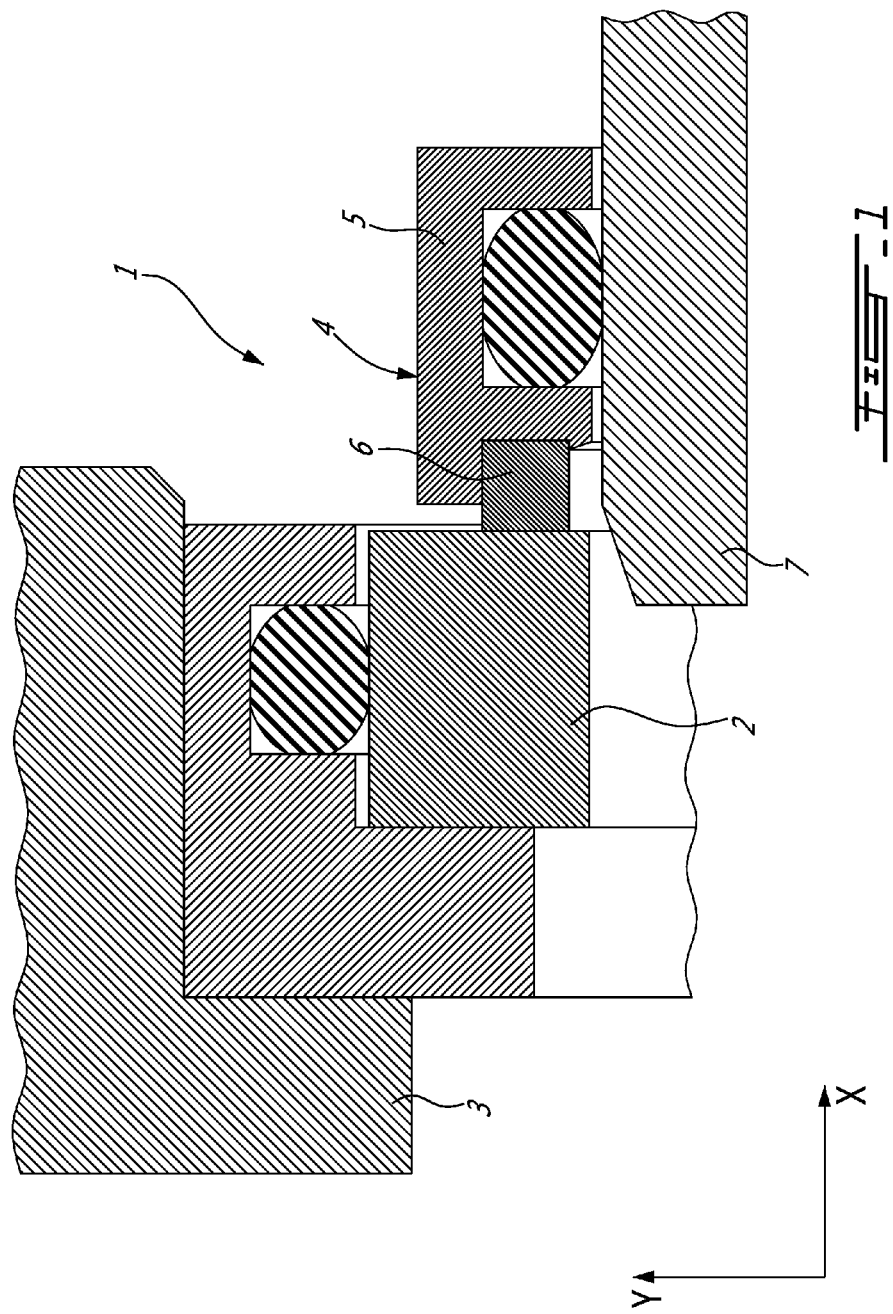
FIG. 1 is a cross-sectional view of a carbon seal assembly between a structure and a shaft.

As shown in FIG. 1, a carbon seal assembly 1 typically includes two major parts: a mating ring 2 made of a magnetic material and attached to a stationary housing 3, and a sealing ring 4 consisting of an assembly of a metal ring 5 and a carbon seal 6 mounted onto a rotating shaft 7. The sealing ring 4 is attracted to the magnet 2 by a magnetic force to create contact pressure in the magnet-to-carbon contact area or wear interface providing therefore positive sealing.

In FIG. 1, the contact between the undercut of the magnet 2 and the carbon seal 6 is at the lower portion of the magnet 2. To have this contact, the carbon seal 6 has a length which is greater than the gap between the magnet 2 and the metal ring 5. When the carbon seal 6 wears sufficiently to close the gap, a direct contact is made between the magnet 2 and the sealing ring 4. It is observed in FIG. 1 that, during direct contact, the wear interface between the carbon seal 6 and the magnet 2 is in the same plane as the direct contact surface between the magnet 2 and the sealing ring 4, resulting in a relatively direct leakage path. In such a situation, the residual part of the carbon seal 6 may not provide sealing especially at increasing metal-to-metal friction heat and vibration.

Figure 2:
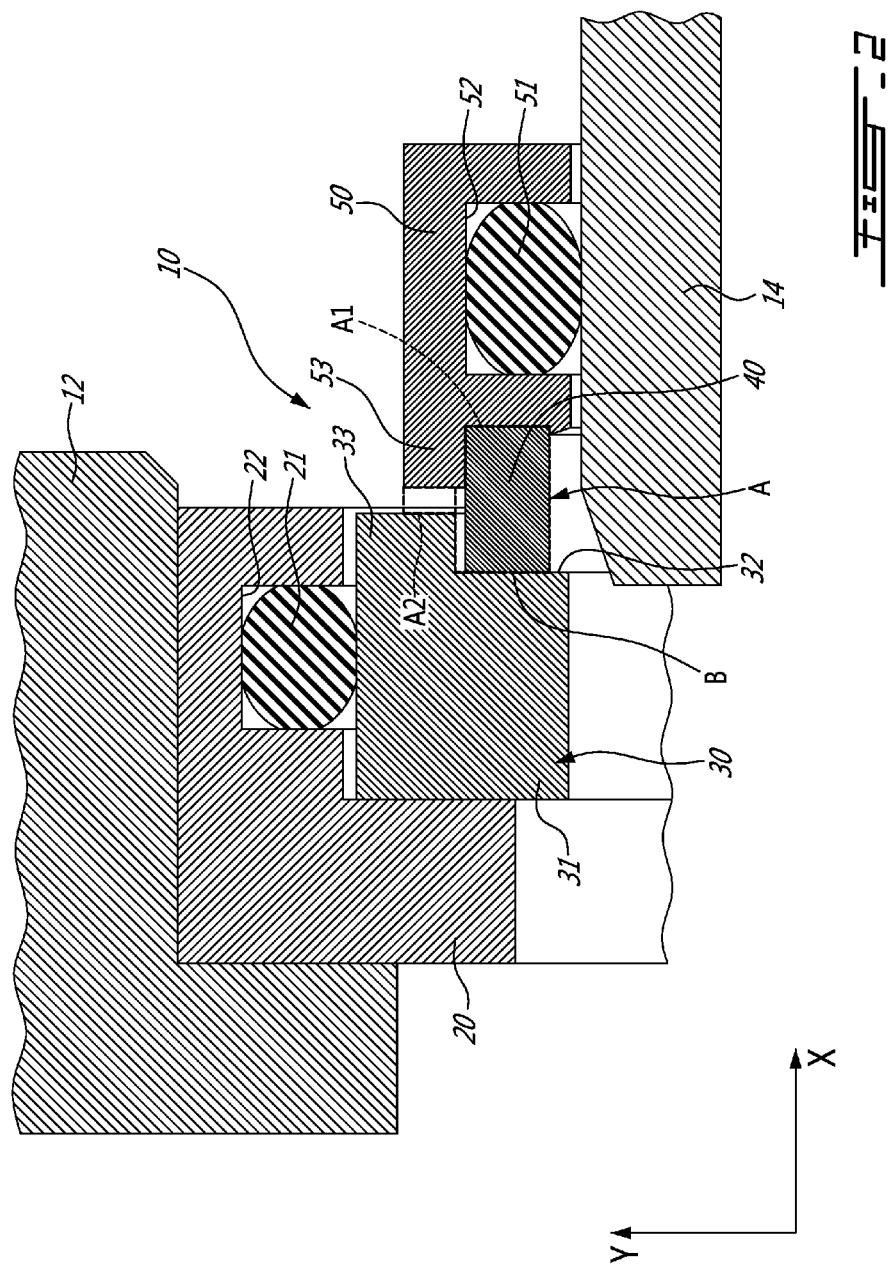
FIG. 2 is a cross-sectional view of a carbon seal assembly between a structure and a shaft in accordance with a first embodiment of the present disclosure.

Referring to FIG. 2, there is illustrated at 10 a carbon seal assembly in accordance with a first embodiment of the present disclosure. The carbon seal assembly 10 is located in a volume between a structure 12 and a rotating component, such as shaft 14. It is pointed out that the structure 12 and the shaft 14 may be in various types of engines, such as gas turbine engines of aircraft. In the illustrated embodiment, the shaft 14 rotates about axis X. Hence, some components of the carbon seal assembly may be annular, as described hereinafter.

When used in a gas turbine engine, the carbon seal assembly 10 of the present invention may be disposed about any rotating shaft or other element thereof, such as for example about at least one of the main engine shafts. Alternately, the carbon seal assembly 10 may be employed to seal another rotating shaft in the gas turbine engine or in another turbomachine, pump, compressor, turbocharger or the like.

The carbon seal assembly 10 may comprise a seal housing 20 that is secured to the structure 12 in any appropriate manner. A seal 21 may be provided in an annular channel 22 defined in the seal housing 20. The seal 21 is shown as being an O-ring but any other type of seal, sealing device or gasket may be used as alternatives to the O-ring. Moreover, more than one seal could be used. The material and the shape of the seal 21 are selected as a function of the contemplated use of the structure 12 and the shaft 14 (pressures, temperatures, exposure to fluids). The annular channel 22 may be defined directly in the structure 12 (no seal housing 20).

An annular magnet 30 (i.e., ring magnet, ring or annular member, etc) may be fixed to the seal housing 20 and hence, immovable relative to the structure 12. The annular member 30 has an annular body 31, with a counterbore 32. Hence, the annular member 30 has a projection or nose 33 extending axially along axis X. In FIG. 2, the annular body 31 and the projection 33 are integral, for instance as a monolithic component, or as secured components.

The annular member 30 may be in contact with the seal 21 to generally prevent fluid leaks between the seal housing 20 and the annular member 30. The seal housing 20 and the annular member 30 project radially inward of the structure 12 toward the shaft 14, so as to partially close the space between the structure 12 and the shaft 14. In another embodiment, the magnet may be secured directly to the structure 12. The annular member 30 is made of any appropriate material producing a suitable attracting force. For instance, the annular member 30 is made of a magnetic material.

An annular carbon element 40 is connected to a seal runner 50 (i.e., metal ring) that rotates with the shaft 14. The annular carbon element 40 is in contact against the annular member 30, with the annular carbon element 40 rotating with the shaft 14 while the annular member 30 is fixed relative to the shaft 14. Hence, the annular carbon element 40 is in a face sealing arrangement. Moreover, there may be a radial gap between the outer surface of the annular carbon element 40 and the inner surface of the annular member 30, to allow for eccentricity between the annular member 30 and the annular carbon element 40 without rubbing. The carbon element 40 is a "hard matter" seal, as opposed to a soft matter seal (e.g., flexible and elastic seals of polymers). The annular carbon element 40 may be carbon in any appropriate constitution in accordance with its use. For instance, graphite may be used.

The runner 50 is typically made of a material complimentary to that of the annular member 30 for attraction forces therebetween. If the annular member 30 is a magnet, the runner 50 could be a metallic material. Alternatively, the runner 50 could be made of a magnetic material while the annular member 30 could be a metallic ring.

A seal 51 is located in a housing 52 of the runner 50. The seal 51 and the housing 52 are of annular shape, as the runner 50 and seal 51 concurrently surround the shaft 14. Accordingly, the seal 51 seals the gap between the shaft 14 and the runner 50. The runner 50 and seal 51 are sized to remain on the shaft 14, for instance by a resilient action of the seal 51 against the shaft 14. The seal 51 is shown as being an O-ring but may be any appropriate type of seal or gasket. For instance, wiper seals, gaskets, cup seals, and the like are a few of the possible sealing devices that could be used between the runner 50 and the shaft 14. The material and the shape of the seal 51 are selected as a function of the contemplated use of the structure 12 and the shaft 14 (pressures, temperatures, exposure to fluids).

A projection or nose 53 may be defined in the runner 50 and provides a counterbore abutment surface for the annular carbon element 40. Other configurations are considered, such as an annular channel, a flat surface, mating engagement, etc. The annular carbon element 40 may be secured to the runner 50 with or without adhesives, mating connectors, fasteners or the like, for the annular carbon element 40 to remain engaged to the runner 50 and rotate therewith.

Still referring to FIG. 2, a gap is generally shown as A between the annular member 30 and the seal runner 50. The annular carbon element 40 is positioned within a first width portion A1 of the gap A, while a second width portion A2 of the gap A is between the face of the projection 33 and the seal runner 50. As the shaft 14 rotates, the carbon element 40 has a wear surface that will rub against the annular member 30, at wear interface B. As a result, the carbon element 40 will wear over time. Due to the attraction forces between the annular member 30 and the runner 50, the runner 50 will gradually move along the shaft 14 in direction X to reach direct contact between the annular member 30 and the runner 50 as shown in FIG. 3, thereby keeping the carbon element 40 against the annular member 30, to seal the gap between the annular member 30 and the runner 50.

Figure 3:
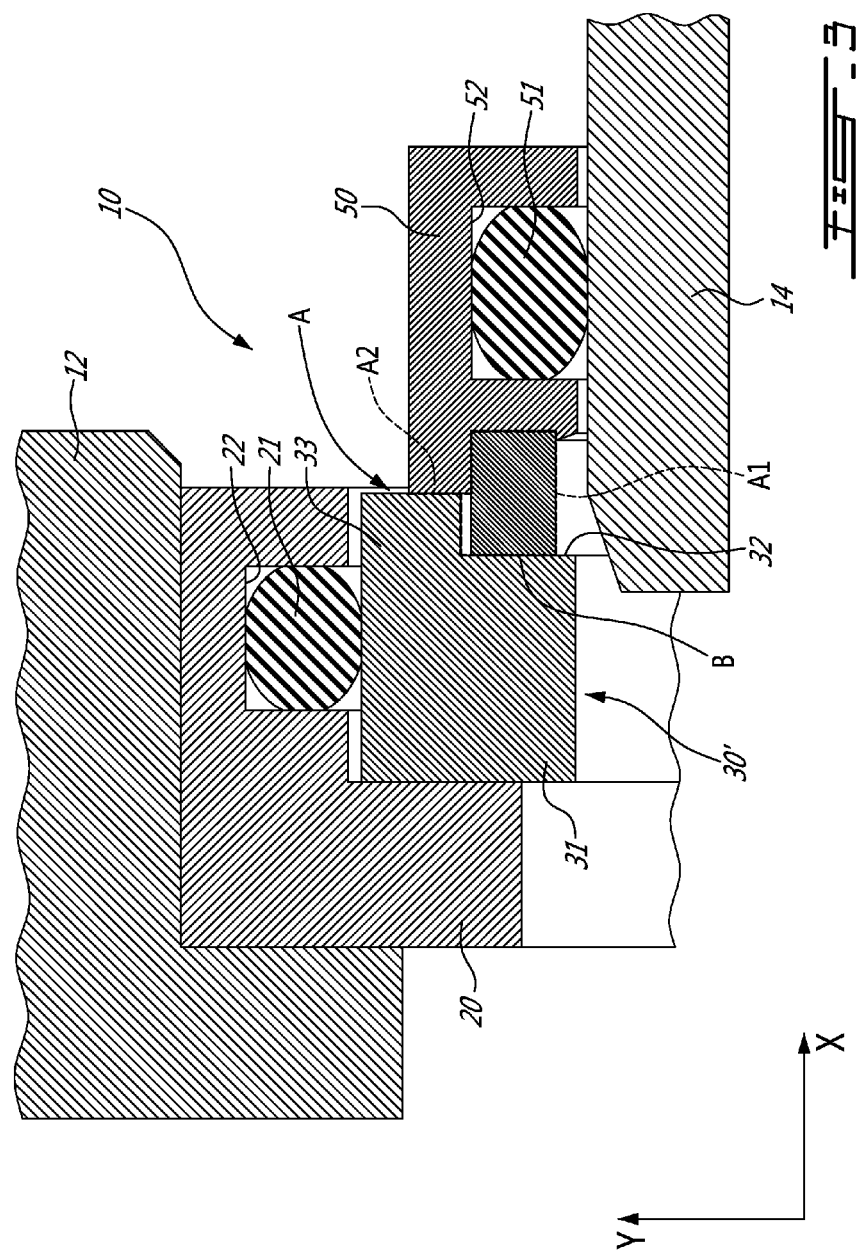
FIG. 3 is a cross-sectional view of the carbon seal assembly of FIG. 2, with a carbon seal element being worn.

It is observed from FIGS. 2 and 3 that an axial plane of the wear interface B between the annular member 30 and the carbon element 40 is radially offset relative to the second width portion A2 of the gap A, relative to axis X. For clarity, the axial plane (a.k.a. transverse plane) is normal to axis X. Hence, there is no continuous gap in a radial direction between the annular member 30 and the carbon element 40/seal runner 50. In other words, when the second width portion A2 has a minimum spacing or direct contact between the projection 33 and the runner 53 due to the wear of the carbon element 40, the carbon element 40 cuts through the plane of the second width portion A2. For illustrative purposes, the axis X is generally normal to the plane of second width portion A2 of FIG. 3.

Referring to FIG. 4, another embodiment of the present disclosure is illustrated. The other embodiment features several of the same components as the embodiment of FIGS. 2 and 3, whereby like components will bear like reference numerals. In the embodiment of FIG. 4, the projection 33' of the annular member 30' is radially inward when compared to the projection 33 of the annular member 30 of FIGS. 2 and 3. Hence, the wear interface B is between the wear surface of the carbon element 40 and face of the projection 33'. Moreover, the projection 53' of runner 50' extends axially beyond the wear interface B such that there is an overlap between the projections 33' and 53'. As a result, the second width portion A2 of the gap A is radially offset relative to the wear interface B. Stated differently, an axial plane of the wear interface B between the annular member 30' and the carbon element 40 is radially offset relative to the second width portion A2 of the gap A, relative to axis X. Hence, there is no continuous gap in a radial direction between the annular member 30' and the carbon element 40/seal runner 50.

Accordingly, in both embodiments of FIGS. 2-4, primary sealing is provided by the carbon element 40 after direct contact of the annular member 30 and the sealing runner 50, to restrict the fluid leakage path following wear of the carbon element 40 leading to the metal-to-metal contact. This may increase the time before maintenance action is required to reduce the risk of mechanical distress related to loss of fluid.

The above description is meant to be exemplary only, and one skilled in the art will recognize that changes may be made to the embodiments described without departing from the scope of the invention disclosed. For example, the annular member 30 may be integrated directly in the structure 12, without housing 20 or seal 21. The runner 50 may be sealingly connected to the shaft 14 by other means than the seal 51, etc. Still other modifications which fall within the scope of the present invention will be apparent to those skilled in the art, in light of a review of this disclosure, and such modifications are intended to fall within the appended claims.

What is claimed is:

1. A carbon seal assembly comprising:
an annular seal runner adapted to be sealingly mounted to a shaft to rotate therewith;
an annular member adapted to be secured to a structure, the annular member having an annular body and a projection extending from the body toward the seal runner in an axial direction relative to an axis of the runner, an axial gap being defined between the member and the seal runner when secured to the shaft and structure respectively, with the projection extending into only a portion of the gap, such that the gap defines a first width portion and a second width portion, with the member and the seal runner being made of complementary materials for magnetic attraction therebetween; and
an annular carbon element mounted to the seal runner to rotate therewith and positioned in the first width portion of the gap, the carbon element having an annular wear surface abutting against the annular member whereby the carbon element axially wears down as it rotates with the seal runner up to a contact condition between the annular member and the seal runner at which the second width portion of the gap is closed by magnetic attraction between the annular member and the seal runner, a plane of the annular wear surface being axially offset from a plane of the second width portion in the contact condition.

2. The carbon seal assembly according to claim 1, wherein the annular wear surface abuts against a face of the projection of the annular member, and wherein the seal runner has a runner projection extending toward the annular member in an axial direction relative to an axis of the shaft to define the second width portion of the gap.

3. The carbon seal assembly according to claim 2, wherein the first portion of the gap is radially inward of the second width portion of the gap relative to the shaft.

4. The carbon seal assembly according to claim 3, wherein the seal runner has a counterbore defining the runner projection, the annular carbon seal element being partly lodged in the counterbore.

5. The carbon seal assembly according to claim 1, wherein the annular wear surface abuts against a face the annular body of the member in the first width portion of the gap, with the second width portion of the gap being defined between a face of the projection and seal runner.

6. The carbon seal assembly according to claim 5, wherein the first width portion of the gap is radially inward of the second width portion of the gap relative to the shaft.

7. The carbon seal assembly according to claim 5, wherein the annular member has a counterbore defining the member projection, the annular carbon seal element being partly lodged in the counterbore of the annular member.

8. The carbon seal assembly according to claim 7, wherein the seal runner has a runner projection extending toward the projection of the annular member in an axial direction relative to an axis of the shaft to define the second width portion of the gap.

9. The carbon seal assembly according to claim 8, wherein the seal runner has a counterbore defining the runner projection, the annular carbon seal element being partly lodged in the counterbore of the seal runner.

10. The carbon seal assembly according to claim 1, wherein the annular carbon seal element is made of hard matter carbon.

11. The carbon seal assembly according to claim 1, wherein the annular member is made of a magnetic material, and wherein the annular seal runner is made of a metallic material attracted to the magnetic material.

12. The carbon seal assembly according to claim 1, further comprising at least one resilient annular seal between the annular seal runner and the shaft.

13. An engine comprising:
a structure;
a shaft operatingly mounted to the structure to rotate relative to the structure;
a carbon seal assembly comprising:
an annular seal runner adapted to be sealingly mounted to a shaft to rotate therewith;
an annular member adapted to be secured to a structure, the annular member having an annular body and a projection extending from the body toward the seal runner in an axial direction relative to an axis of the runner, an axial gap being defined between the member and the seal runner when secured to the shaft and structure respectively, with the projection extending into only a portion of the gap, such that the gap defines a first width portion and a second width portion, with the member and the seal runner being made of complementary materials for magnetic attraction therebetween; and
an annular carbon element mounted to the seal runner to rotate therewith and positioned in the first width portion of the gap, the carbon element having an annular wear surface abutting against the annular member whereby the carbon element axially wears down as it rotates with the seal runner up to a contact condition between the annular member and the seal runner at which the second width portion of the gap is closed by magnetic attraction between the annular member and the seal, a plane of the annular wear surface being axially offset from a plane of the second width portion in the contact condition.

14. The engine according to claim 13, wherein the annular wear surface abuts against a face of the projection of the annular member, and wherein the seal runner has a runner projection extending toward the annular member in an axial direction relative to an axis of the shaft to define the second width portion of the gap.

15. The engine according to claim 14, wherein the first width portion of the gap is radially inward of the second width portion of the gap relative to the shaft.

16. The engine according to claim 13, wherein the annular wear surface abuts against a face the annular body of the member in the first width portion of the gap, with the second width portion of the gap being defined between a face of the projection and seal runner.

17. The engine according to claim 16, wherein the annular member has a counterbore defining the member projection, the annular carbon seal element being partly lodged in the counterbore of the annular member.

18. The engine according to claim 13, wherein the annular carbon seal element is made of hard matter carbon.

19. The engine according to claim 13, wherein the annular member is made of a magnetic material, and wherein the annular seal runner is made of a metallic material attracted to the magnetic material.

20. The engine according to claim 13, further comprising at least one resilient annular seal between the annular seal runner and the shaft.

* * * * *